United States Patent [19]
Klinke et al.

[11] Patent Number: 5,115,782
[45] Date of Patent: May 26, 1992

[54] METHOD FOR CONTROLLING A SPARK-IGNITION ENGINE WITHOUT A THROTTLE FLAP

[75] Inventors: Christian Klinke, Pleidelsheim; Heinz Stutzenberger, Vaihingen/Enz; Engelbert Tillhon, Lauffen, all of Fed. Rep. of Germany

[73] Assignee: Robert Bosch GmbH, Stuttgart, Fed. Rep. of Germany

[21] Appl. No.: 625,031

[22] Filed: Dec. 10, 1990

[30] Foreign Application Priority Data

Dec. 9, 1989 [DE] Fed. Rep. of Germany ....... 3940752

[51] Int. Cl.$^5$ .................... F01L 9/04; F02D 41/14; F02D 37/00
[52] U.S. Cl. .................... 123/489; 123/90.11; 123/308
[58] Field of Search .................... 123/90.11, 347, 308, 123/489

[56] References Cited

U.S. PATENT DOCUMENTS

| | | | |
|---|---|---|---|
| 3,682,152 | 8/1972 | Muller-Berner | 123/90.11 |
| 3,738,337 | 6/1973 | Massie | 123/90.11 X |
| 3,935,846 | 2/1976 | Zelenka | 123/90.11 X |
| 4,285,310 | 8/1981 | Takizawa et al. | 123/308 |
| 4,700,684 | 10/1987 | Pischinger et al. | 123/90.11 X |
| 4,945,870 | 8/1990 | Richeson | 123/90.11 |

FOREIGN PATENT DOCUMENTS

| | | | |
|---|---|---|---|
| 96135 | 6/1983 | Japan | 123/90.11 |
| 1395027 | 5/1975 | United Kingdom | 123/90.11 |
| 1471537 | 4/1977 | United Kingdom | 123/90.11 |

OTHER PUBLICATIONS

Paper by J. H. Tuttle entitled "Controlling Engine Load by Means of Early Intake-Valve Closing", SAE-Paper 820408 (1982), pp. 1 to 15.

*Primary Examiner*—Tony M. Argenbright
*Attorney, Agent, or Firm*—Walter Ottesen

[57] ABSTRACT

A method for controlling a spark-ignition engine without a throttle flap is carried out with variable inlet valve opening durations. The method includes the steps of: detecting a speed signal having a value dependent upon the engine speed; detecting an accelerator pedal signal having a value dependent upon the accelerator pedal position; determining the intake valve opening durations as well as the fuel quantity in dependence upon the particular values of the engine speed signal and the accelerator pedal signal; and, determining the ignition angle in the dependence upon the particular values of the engine speed and fuel quantities. The method affords the advantage that for all driving conditions and even for sudden changes of the accelerator pedal signal, the masses of air and fuel are optimally adapted to each other in order to obtain high driving comfort without misfirings and with low toxic gas exhaust.

8 Claims, 3 Drawing Sheets

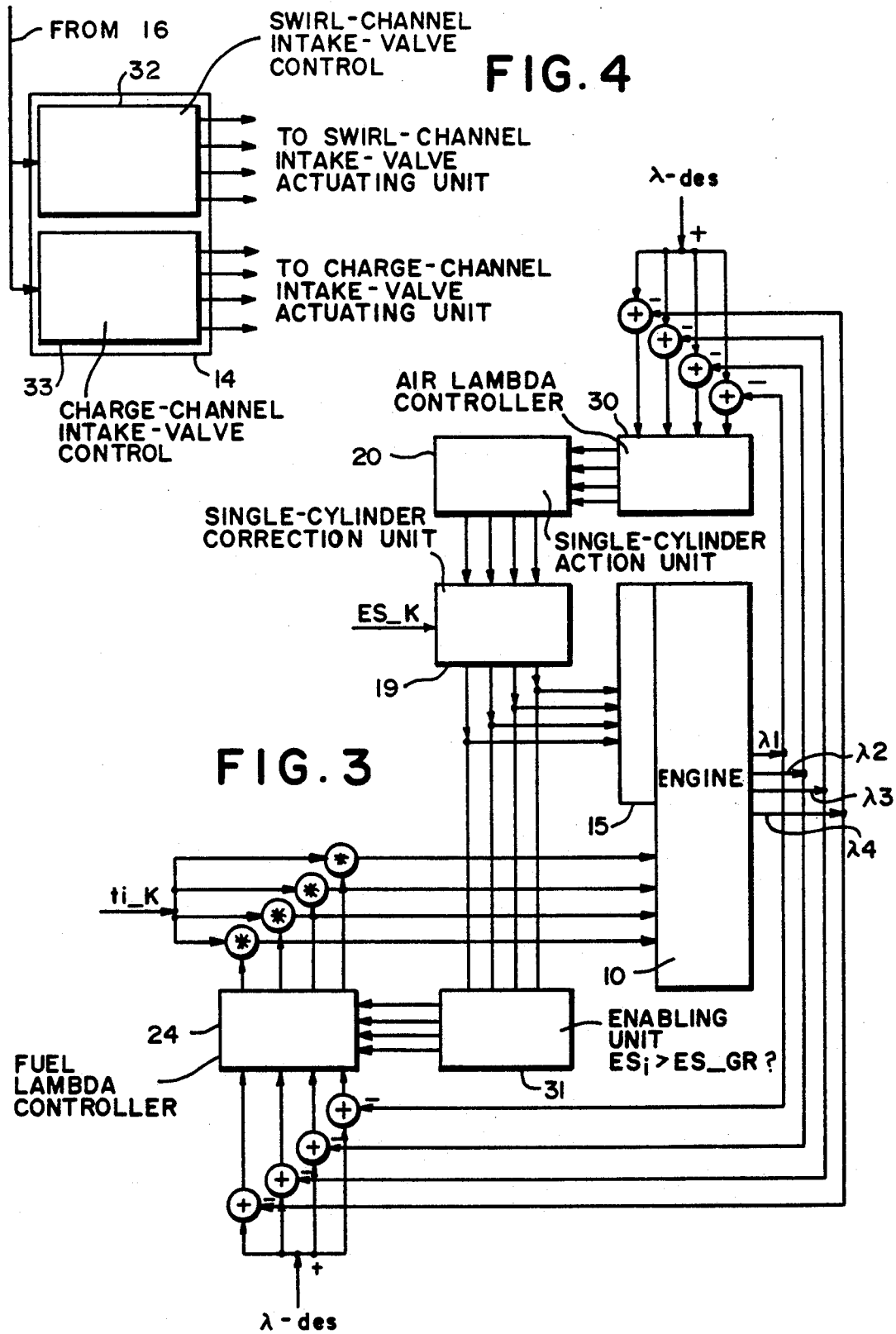

METHOD FOR CONTROLLING A SPARK-IGNITION ENGINE WITHOUT A THROTTLE FLAP

FIELD OF THE INVENTION

The invention relates to a method for controlling an engine without a throttle flap with the aid of variable inlet valve opening durations. The engine can have a single inlet channel per cylinder or several inlet channels per cylinder and especially a swirl channel and a charging channel. Individually controllable outlet valves can also be present in addition to individually drivable inlet valves.

BACKGROUND OF THE INVENTION

In the material which follows, the time points "intake open" and "intake close" will be used and relate to the particular crankshaft angle differences referred to top dead center of a piston at the beginning of an intake stroke or to bottom dead center at the end of an intake stroke. The statement that a time point such as "inlet open" is constant means that for all cylinders, the crankshaft angle difference mentioned above is the same.

A method of controlling a four-stroke spark-ignition engine without a throttle flap is disclosed in the article by J. H. Tuttle entitled "Controlling Engine Load by Means of Early Intake Valve Closing", SAE-Paper 820408 (1982), pages 1 to 15. In order to obtain different intake volumes notwithstanding the absence of the throttle flap, the time points "inlet close" were varied for each constant time point "inlet open".

SUMMARY OF THE INVENTION

It is an object of the invention to provide a method for controlling a spark-ignition engine without a throttle flap with the aid of variable intake valve opening durations which permit an engine to be driven so that its operation in a motor vehicle provides comfortable driving with the least possible consumption and lowest toxic exhaust.

The method of the invention includes the steps of: detecting a speed signal having a value dependent upon the engine speed; detecting an accelerator pedal signal having a value dependent upon the position of the accelerator pedal; and, determining the particular values of intake valve opening durations and fuel quantity in dependence upon the corresponding values of the engine speed signal and the accelerator pedal signal.

This method assures that the air mass and the fuel quantity are always optimally adapted to each other in order to obtain minimal toxic gas exhaust. The method assures that even for sudden accelerator pedal changes, the air/fuel mixture does not become lean or rich to the extent that misfirings occur or that the converting efficiency of the catalytic exhaust gas follow-on treatment is reduced. Excellent driving comfort is obtained even during transient operations.

It is especially advantageous to determine the ignition time points in dependence upon the values of an engine speed signal and of a fuel-quantity signal. The fuel-quantity signal is usually corrected in many ways. Furthermore, the fuel quantity is the decisive measure for the torque output of the engine and therewith also for the required ignition angle for optimal ignition.

The intake valve arrangement at each cylinder must be operable with variable opening durations for an engine having several cylinders. This makes possible another embodiment of the invention wherein different intake valve opening durations are so determined for different cylinders that all active cylinders take in essentially the same quantity of an air/fuel mixture. This provides for a very uniform distribution of torque and the least possible toxic gas exhaust for all cylinders.

It is advantageous that not all cylinders are active in the part-load range; instead, the intake valve arrangement is no longer open in the presence of a part-load signal for at least one cylinder. This method is preferably further modified for intake valve arrangements which include two valves per cylinder. More specifically, the charging channel intake valves are continuously held closed while the opening duration for the swirl channel is so determined that that air mass is drawn in which is determined only by the opening duration per intake channel which is pregiven by the particular values of accelerator pedal signal and the speed signal.

To determine the intake valve opening durations, the time points "intake open" as well as "intake close" can be varied. A change over a large crankshaft angle range is especially possible for "intake close". Accordingly, it is advantageous to influence the time points "intake close" in order to draw in by suction the desired air mass. A variation of the time point "intake open" preferably takes place in order to drive an intake valve so that it already opens when the corresponding cylinder piston still displaces exhaust gas from the corresponding cylinder in order to obtain an exhaust gas return.

With the method of the invention, air and fuel are determined together by the particular value of the engine speed signal and the accelerator pedal signal. This fact makes it possible to carry out many control operations in an advantageous manner by modifying the accelerator pedal signal with the modification taking place such that the value of the engine operating value to be controlled is moved in the direction toward the particular value desired. This can be utilized, for example, for the control of the following: idle, knocking, wheel-slip, engine drag torque, driving speed, engine speed, speed limiting or for obtaining smooth transitions during automatic shifting.

BRIEF DESCRIPTION OF THE DRAWINGS

The invention will now be described with reference to the drawings wherein:

FIG. 3 is a block diagram of a variable valve control having a lambda-value control device; and, FIG. 4 is block diagram of an intake valve control which is subdivided into a swirl channel intake valve control and a charging channel intake valve control which illustrates the method of the invention for the condition wherein the swirl channel intake valve and charging channel intake valve are controlled differently.

DESCRIPTION OF THE PREFERRED EMBODIMENTS OF THE INVENTION

Figure 1:
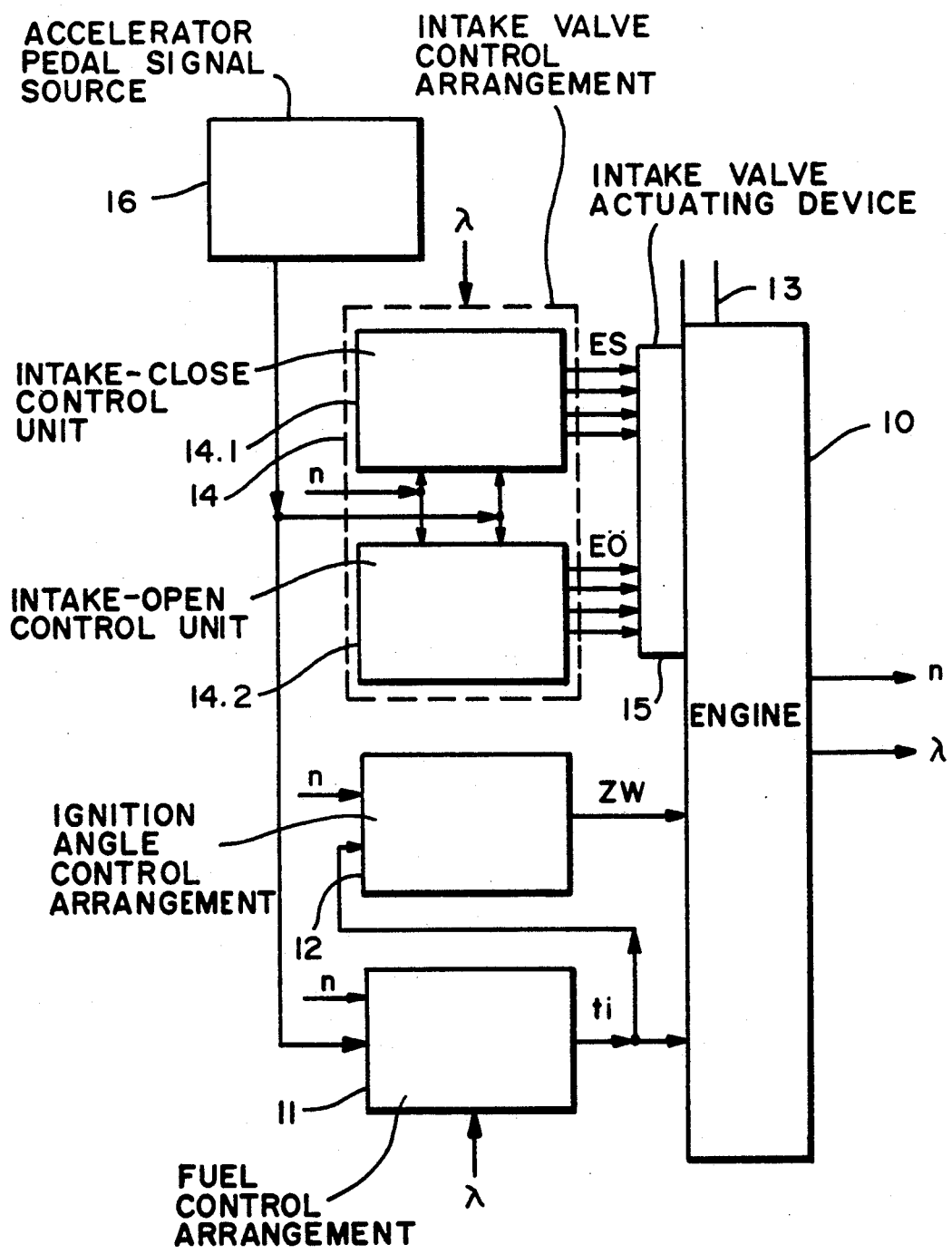
FIG. 1 is a block diagram of a control arrangement for illustrating the method of the invention for controlling the intake air mass and fuel quantity for a four-stroke spark-ignition engine without a throttle flap.

In the operation of the spark-ignition engine 10 shown as a function block in FIG. 1, the air and fuel supplied to the engine and the ignition time points are adjusted in dependence upon operating conditions.

The arrangement for supplying air to the engine is significantly different from the embodiment presently used for the conventional spark-ignition engines. More specifically, no throttle flap arrangement is provided in the intake arrangement 13. In lieu of the throttle flap arrangement, the air is controlled with the aid of an intake valve control arrangement 14 which is subdivided into an intake-close control unit 14.1 and an intake-open control unit 14.2 in the embodiment shown. The intake-close control unit 14.1 supplies four signals ES to an intake-valve actuating device 15; whereas, the intake-open control unit 14.2 supplies four signals (EÖ) to the device 15. It is here noted that the above and the following is based upon a four-cylinder spark-ignition engine; however, the number of cylinders is selected only for the purposes of example.

The time position of the signals EÖ and ES is determined in dependence upon values of an accelerator pedal signal $\gamma$ and the engine speed signal n. The signal $\gamma$ is supplied by an accelerator pedal signal source 16. The signal n is supplied by an engine speed sensor not shown in FIG. 1.

In conventional spark-ignition engines, the signal of an air-flow sensor or of an intake pipe pressure sensor is used to determine load. The measurement devices mentioned above have dynamic errors associated therewith which are in part caused by the sensors (flap air-quantity sensor) and in part caused by the measuring principle (actualization of the load signal evaluation - "actualization error") or the errors occur because of the arrangement of the sensor in the intake system ahead of the air distributor ("phase errors"). To avoid these errors, such a measurement arrangement is not provided in the application. This control principle can be utilized because of the fact that the intake pipe pressure is constant on the average. For controlling the air mass flow, the intake pipe pressure corresponds essentially continuously to the ambient air pressure in a spark-ignition engine 10 having no throttle arrangement. For this reason, very accurate predictions of the air mass drawn in by suction in dependence upon the intake duration is possible as this intake duration is adjusted by an intake-valve arrangement at each cylinder.

The accelerator pedal signal $\gamma$ and the speed signal n are also supplied to the fuel control arrangement 11. With the aid of these signals, the air mass per stroke as well as the fuel mass per stroke are controlled. If both controls are not completely adapted to each other, then compensation is provided with the aid of a lambda control. The lambda control acts either only on the fuel control arrangement 11 or on the intake valve control arrangement 14 as well. This is indicated in FIG. 1 by the lambda signal $\lambda$ which is supplied to both of the above-mentioned arrangements. The control of the lambda value with the aid of the intake valve control arrangement affords the advantage that a very rapid response is obtained for changes of the lambda value. However, a control via the air is only possible so long as the maximum charge has not yet been reached. If the lambda value must be increased for maximum charge, that is, more air must be provided in proportion to the fuel mass supplied, then this can no longer take place via a control increase of the air mass; instead, this can only occur via a controlled lowering of the fuel mass per stroke.

From the function of the lambda control via the air mass flow as described above it can be seen that this type of control is independent of whether the air mass flow as a whole takes place with the aid of a conventional throttle arrangement supported by a conventional variable valve control or only by means of a variable valve control.

The ignition angle control arrangement 12 can receive the accelerator pedal signal as a load value or it can receive a signal derived from this accelerator pedal signal. However, it is more advantageous to utilize the output signal of the fuel control arrangement 11 as a load signal since this signal can be usually corrected in many ways. Furthermore, the injection quantity is the decisive measure for the torque output of the engine and therefore also for the required ignition angle. The ignition angle control arrangement 12 therefore receives the injection signal ti as a load signal and supplies an ignition signal ZW to the engine 10.

Figure 2:
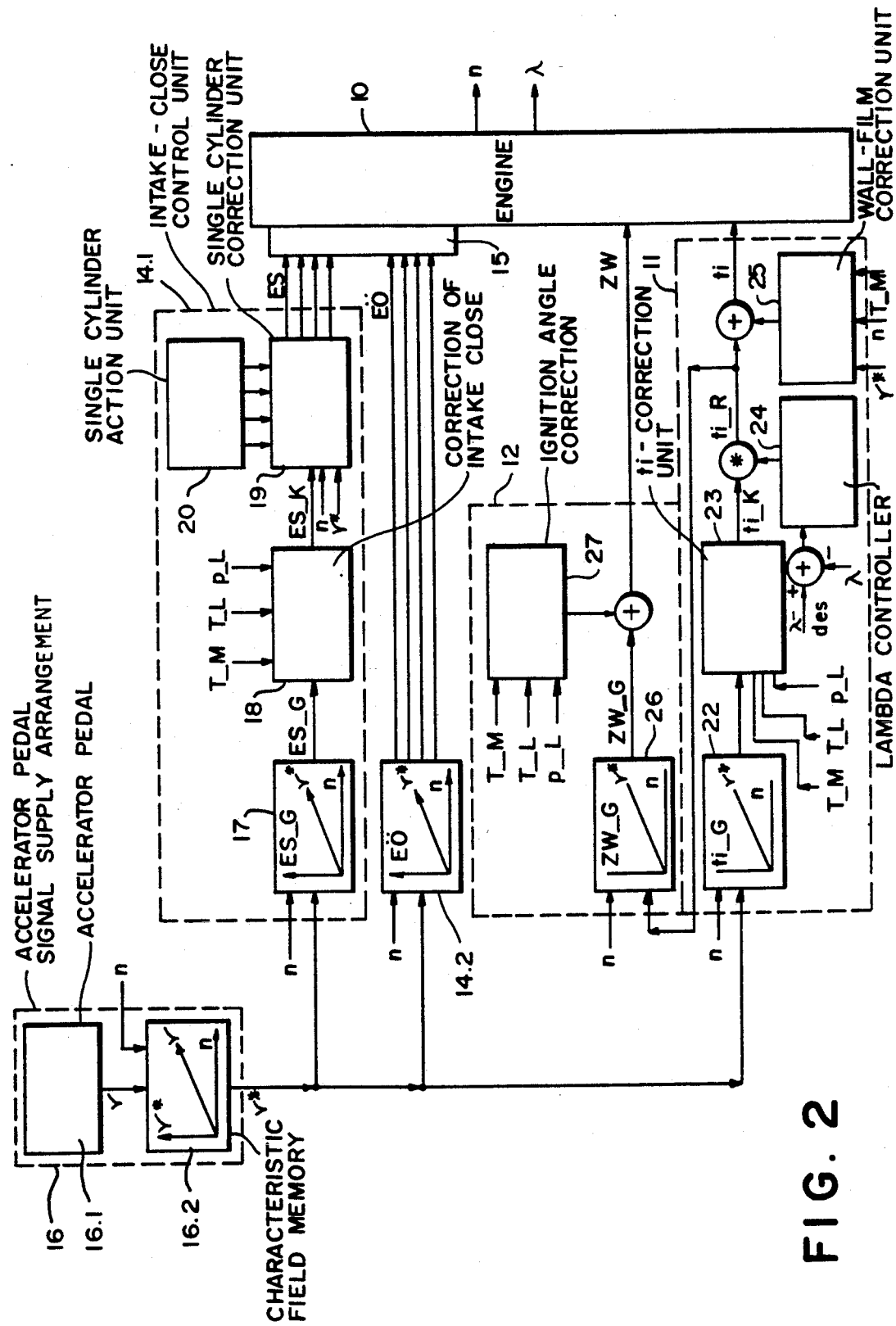
FIG. 2 is a further detailed block diagram which supplements FIG. 1.

FIG. 2 relates to a preferred embodiment wherein the accelerator pedal signal supply arrangement 16 comprises an accelerator pedal 16.1 and an accelerator pedal signal characteristic-field memory 16.2. The characteristic-field memory 16.2 supplies an accelerator pedal signal $\gamma^*$ in dependence upon the magnitude of the direct accelerator pedal signal $\gamma$ and in dependence upon the speed n of the spark-ignition engine 10. With the aid of the characteristic field in the accelerator pedal signal characteristic-field memory 16.2, the load take-up performance of the engine can be predetermined in dependence upon the accelerator pedal position and the engine speed.

The intake-close control unit 14.1 includes four blocks, namely: an intake-close basic characteristic-field memory 17, an overall correction unit 18, a single-cylinder correction unit 19 and a single-cylinder action unit 20. A base variable ES_G for the closure angle for the intake valve is supplied from the basic characteristic-field memory 17 in dependence upon the particular engine speed n and the particular accelerator pedal signal $\gamma^*$. This base variable is converted into a corrected variable ES_K in the overall correction unit 18. In the embodiment, a multiplicative logic connection is made to a function dependent upon engine temperature T_M, a function dependent upon the air temperature T_L and a function dependent upon air pressure p_L. The higher, for example, the air temperature is for the same air pressure, that much later the intake valve must close so that the same air mass per stroke is passed through for the same opening time point and for the same operating conditions. The single-cylinder correction unit 19 makes a cylinder-dependent individual correction in dependence upon the accelerator pedal signal $\gamma^*$ and the engine speed n. This single-cylinder correction unit 19 compensates for construction-dependent differences in the conduction of the air. In this way, it is assured that each cylinder for each engine speed and each load draws substantially the same amount of air per stroke. The purpose of the single-cylinder unit 20 will be explained below.

The intake-open control unit 14.2 is configured as a characteristic field in the embodiment of FIG. 2. This characteristic field supplies a value for the crankshaft angle in dependence upon engine speed n and accelerator pedal signal $\gamma^*$ at which the intake valve should open ahead of its top dead center point. The angle is the same for all four intake valves for each pairing of engine speed and load (accelerator pedal signal).

The single-cylinder unit 20 in the intake-close control unit 14.1 operates to switch off individual cylinders in the lower load range. The arrangement 20 assures that selected intake valves are again closed after opening or that they are not opened at all, for example, when the close signal ES is supplied at the same time as the opening signal EÖ. For the purpose mentioned, the single-cylinder unit 20 can also operate on the signal EÖ for the different intake valves and for the purpose that in the lower load range, opening signals are not supplied to at least one intake valve so that this intake valve remains closed continuously and thereby air exchange losses are avoided. At the same time, the fuel metering to the cylinder cut off from the gas exchange is prevented. The signals from the single-cylinder unit 20 are effective for the above-mentioned purpose and also act on the fuel control arrangement 11 shown in FIG. 2.

In the embodiment of FIG. 2, the fuel control arrangement 11 includes an injection time characteristic-field memory 22, a correction unit 23, a lambda controller 24 and a wall-film correction unit 25. The logic connection of these functional components is shown in FIG. 2. The control arrangement 11 is an arrangement which is available in the marketplace in the most varied forms apart from the wall-film correction unit 25. With the aid of the wall-film correction unit, a correction is carried out on an injection time signal which is otherwise used in a conventional manner as supplied by a fuel control arrangement. This correction considers the dynamic response of the fuel wall film in the intake pipe. Any desired wall-film correction model can be used. Wall-film corrections are basically used in control processes for transient operations The wall-film correction with the aid of the correction unit 25 supports the excellent driving and exhaust gas characteristics of the arrangement of FIG. 2 in the manner in which they are obtainable by the rapid response performance of the air mass flow with the aid of variable valve control.

The ignition angle control arrangement 12 too comprises two known function components, namely, an ignition angle characteristic-field memory 26 and an ignition angle correction unit 27. A base magnitude $ZW\_G$ for the ignition angle is supplied from the ignition angle characteristic-field memory 26 in dependence upon the engine speed n and the controlled injection time $ti\_R$. The base magnitude $ZW\_G$ is corrected additively with functions with the aid of the ignition angle correction unit 27 which considers the dependence of the ignition angle on the engine temperature $T\_M$, the air temperature $T\_L$ and the air pressure $p\_L$.

FIG. 3 relates to a spark-ignition engine 10 having function components which take care of the lambda control via the air mass flow and the fuel flow. In the embodiment of FIG. 3, a lambda probe is arranged in all four exhaust gas elbows, respectively, of the four-cylinder spark-ignition engine 10 whereby it is possible to control the lambda value for all four cylinders individually. The lambda values measured by the four probes are applied to the comparator device of the fuel lambda controller 24 as actual values and are also applied to the comparator device of an air lambda controller 30. In the particular comparator devices, the four lambda actual values are compared to a lambda desired value. The two controllers 24 and 30 supply position signals in dependence upon the magnitude of the respective control deviations. The position signals from the fuel lambda controller 24 are processed in the usual manner. The position signals from the air lambda controller 30 are applied to the single-cylinder action unit 20 and are there transmitted to the individual correction component 19 as described above with respect to FIG. 3.

An enabling unit 31 is important for the operation of the arrangement of FIG. 3. The enabling unit 31 enables the fuel lambda controller 24 with respect to its intervention capability on the injection time on an individual cylinder only when the maximum charge for the cylinder is reached. The presence of a maximum charge is checked in the embodiment of FIG. 3 in that for each cylinder, there is a separate check as to whether the close angle $ES\_i$ exceeds a limit value $ES\_GR$ for the corresponding intake valve. As soon as this condition is fulfilled, the fuel lambda controller 24 is enabled with respect to its action for the corresponding cylinder. The air lambda controller constitutes a stop for the corresponding cylinder.

Individual cylinder fuel control arrangements are known in various embodiments. Such control arrangements can be provided with adaptation devices in the same manner as overall control arrangements and with an adaptation arrangement for the injection times for each individual cylinder. Correspondingly, differently configured air lambda controllers 30 can be used for the air control with or without an adaptation device.

The fuel lambda controllers presently in use provide no control for individual cylinders; instead, they control the injection times for all cylinders in common with a single lambda actual value. Correspondingly, the intake durations for all intake valves can be controlled in common with such an individual lambda actual value.

A method is illustrated in FIG. 3 as to how the opening durations of intake valves can be influenced via a lambda control. Correspondingly, other conventional controls can also intervene such as idle controls or knocking controls. If it is not intended to control the cylinders individually, then it is advantageous to influence the direct accelerator pedal signal $\gamma$ or even the accelerator pedal signal $\gamma^*$. The accelerator pedal signal can be influenced in a controlled manner also by a wheel-slip control, an engine drag torque control, a road speed control or an engine speed limit or speed limit. During shifting operations, the reduction of the accelerator pedal signal $\gamma^*$, which cannot be influenced by the driver, achieves a smooth transition. In this way, the reduction of the ignition angle which is usually unfavorable for the engine efficiency is avoided.

Exhaust gas return can be obtained by varying the opening time points of the intake valves in dependence upon the operating point. With an advanced opening, exhaust gas reaches the intake line even during an upward movement of the piston and this exhaust gas is again drawn in by suction at the start of the following intake stroke. The exhaust gas return rate is controlled in dependence upon the selected opening time point.

The intake valve control 14 according to FIG. 1 cannot only be subdivided according to the viewpoint "intake close" and "intake open"; instead, the intake valve control 14 can also be viewed as to how many intake valves per cylinder are controllable. One possibility is that when driving different intake valves for a cylinder, no difference is made. Another possibility is shown in FIG. 4.

In FIG. 4, an intake valve control 14' is functionally subdivided in a swirl-channel intake-valve control 32 and a charge-channel intake-valve control 33. Air flowing through the swirl channel is made very turbulent and this leads to a good mixture preparation. In contrast, air through a charge channel flows with the least possible resistance and therefore with relatively little turbulence.

It is advantageous to vary the methods described above when applying the same to a spark-ignition engine configured with such channels so that in a lower load range, in which the airflow through these swirl channels is adequate, the charge channel intake valves remain continuously closed. The durations of the control signals for the swirl channel intake valves are so determined that by means of these opening durations per intake stroke essentially that air mass is drawn in by suction which is pregiven by the particular value of the accelerator pedal signal. If the air mass drawn in by suction because of the accelerator pedal position exceeds the above given limit, the swirl channel intake valves are so controlled that they permit the maximum possible air quantity to flow in. The durations of the drive signals for the charge channel intake valves are in contrast so determined that, per intake stroke, essentially that air mass is drawn in by suction which is pregiven by the particular value of the accelerator pedal signal. If the given limit is not exceeded but there is a drop therebelow instead, it is advantageous to switch off individual cylinders entirely and, in the remaining cylinders, to drive only the swirl channel intake valves with the opening durations being selected in the manner described above.

In a preferred embodiment, knock sensors (not shown) are provided on the engine in order to selectively detect the knock performance of each cylinder. If it is determined that a cylinder knocks, then the intake time is changed so that the knocking stops. This affords the advantage that the ignition angle displacement conventional until now and which increases consumption, can be omitted for eliminating knocking.

The block circuit diagrams according to FIGS. 1 to 4 show only the methods for driving a spark-ignition engine without a throttle flap. The method sequence described is realized in practice by microprocessors and not by circuit blocks which are assigned to the function blocks of the drawings.

It is understood that the foregoing description is that of the preferred embodiments of the invention and that various changes and modifications may be made thereto without departing from the spirit and scope of the invention as defined in the appended claims.

What is claimed is:

1. A method for controlling a spark-ignition engine having a fuel control arrangement and being without a throttle flap and without an air-flow sensor or intake pipe pressure sensor, the method being carried out with an intake valve control arrangement for providing variable air intake valve opening durations and comprising the steps of:

detecting an engine speed signal having a value dependent upon engine speed;

detecting an accelerator pedal signal ($\gamma$) having a value dependent upon accelerator pedal position; and, determining the air intake valve opening durations (ES−EÖ) and the fuel quantities (ti) in dependence upon corresponding values of the engine speed and accelerator pedal signals and applying said signals to said fuel control arrangement and to said intake valve control arrangement; and, applying a lambda control signal $\lambda$ to said fuel control arrangement to finely adjust the quantity of fuel injected in dependence upon the oxygen content of the exhaust gas.

2. The method of claim 1, further comprising the step of determining the ignition time points (ZW) in dependence upon the values of the engine speed signal (n) and a fuel quantity signal (ti).

3. The method of claim 1, further comprising the step of determining different intake valve opening durations (EO−EÖ) for different cylinders so as to cause all active cylinders to take in substantially the same quantity of air/fuel mixture.

4. The method of claim 1, wherein the intake valve arrangement of at least one cylinder is no longer opened in the presence of a part-load signal.

5. The method of claim 1, the engine having a swirl channel and a charge channel for each cylinder thereof, the method comprising the further steps of:

holding the charge-channel valves continuously closed in the lower load range of the engine and fixing the opening durations for the swirl-channel valves so as to set essentially that quantity of air drawn in by suction exclusively by said open duration per intake stroke which is pregiven by the particular values of accelerator pedal and engine speed signals; and, in the load range above the lower load range, driving the swirl-channel valves so as to cause the swirl-channel valves to have the opening duration required for the greatest intake-air throughflow and setting opening durations for the charge-channel intake valves so as to cause essentially that air mass to be taken per intake stroke which is pregiven by the particular values of the accelerator pedal and engine speed signals.

6. The method of claim 1, wherein the start of the open duration for a particular intake valve is set so early that the intake valve already opens when the cylinder piston corresponding thereto still pushes exhaust gas out of the cylinder of the piston in order to obtain a feedback of exhaust gas.

7. The method of claim 1, wherein the accelerator pedal signal ($\gamma$) is so modified for controlling engine operating variables that the value of the particular engine operating variable which is controlled is caused to move in the direction toward the particular desired value.

8. The method of claim 1, wherein the knocking performance of the engine is selectively monitored and the intake valve open duration for each cylinder is set so that knocking does not occur in virtually any cylinder.

* * * * *

UNITED STATES PATENT AND TRADEMARK OFFICE
CERTIFICATE OF CORRECTION

PATENT NO. : 5,115,782

DATED : May 26, 1992

INVENTOR(S) : Christian Klinke, Heinz Stutzenberger and Engelbert Tillhon

It is certified that error appears in the above-identified patent and that said Letters Patent is hereby corrected as shown below:

In the title page, in the Abstract, line 11: delete "the" (first occurrence).

In column 7, line 61, after "signal", insert -- (n) --.

Signed and Sealed this

Twenty-third Day of November, 1993

Attest:

BRUCE LEHMAN

Attesting Officer     Commissioner of Patents and Trademarks